(12) United States Patent
Battaglia

(10) Patent No.: US 6,515,253 B1
(45) Date of Patent: Feb. 4, 2003

(54) PROCESS FOR LASER MACHINING CONTINUOUS METAL STAMPED STRIP

(76) Inventor: Vincent P. Battaglia, 209 Banks Rd., Easton, CT (US) 06612

( * ) Notice: Subject to any disclaimer, the term of this patent is extended or adjusted under 35 U.S.C. 154(b) by 0 days.

(21) Appl. No.: 09/548,561

(22) Filed: Apr. 13, 2000

(51) Int. Cl.[7] .................................................. B23K 26/38
(52) U.S. Cl. .............................. 219/121.67; 219/121.72
(58) Field of Search ..................... 219/121.67, 121.68, 219/121.69, 121.7, 121.71, 121.72

(56) References Cited

U.S. PATENT DOCUMENTS

| | | |
|---|---|---|
| 1,151,983 A | 8/1915 | Winfield |
| 3,226,527 A | 12/1965 | Harding |
| 3,256,524 A | 6/1966 | Stauffer |
| 3,932,967 A | 1/1976 | Hanes |
| 4,180,906 A | 1/1980 | May |
| 4,182,084 A | 1/1980 | Friedenberg |
| 4,301,593 A | 11/1981 | May |
| 4,328,411 A * | 5/1982 | Haller et al. |
| D279,509 S | 7/1985 | Abe et al. |
| D279,825 S | 7/1985 | Takizawa |
| D284,224 S | 6/1986 | Izumi |
| 4,782,208 A | 11/1988 | Withrow et al. |
| 5,058,413 A | 10/1991 | Muddiman |
| 5,089,062 A | 2/1992 | Pavlik et al. |
| D356,184 S | 3/1995 | Izumi |
| 5,395,028 A | 3/1995 | Ishii et al. ..................... 226/76 |
| 5,728,284 A | 3/1998 | Oyama |
| 5,750,956 A * | 5/1998 | Bavnes et al. ......... 219/121.71 |
| 5,919,122 A * | 7/1999 | Geiger et al. ............ 219/121.7 |
| 6,183,064 B1 * | 2/2001 | Murthy et al. ......... 219/121.67 |

FOREIGN PATENT DOCUMENTS

| | | |
|---|---|---|
| DE | 41 28 194 A1 | 3/1993 |
| DE | 4422137 * | 2/1995 |

* cited by examiner

Primary Examiner—Geoffrey S. Evans
(74) Attorney, Agent, or Firm—DeLio & Peterson LLC

(57) ABSTRACT

A process for laser machining continuously metal stamped strip feeds a strip of metal into an otherwise conventional press and partially, mechanically forms a part in the strip, without removing the part from the strip. The partially formed part, as still attached to the strip, is then fed continuously into a laser machining station where a laser then performs the desired machining, e.g., hole cutting, etching (e.g., partial cutting through a thickness) or other conventional laser machining processes, to the part while attached to the strip. The laser machining may also precede the mechanical forming. The partially formed, laser machined part, again as it is still attached to the strip, is then fed into another press and the mechanical part formation is finished and/or the part is cut out and separated from the strip.

24 Claims, 10 Drawing Sheets

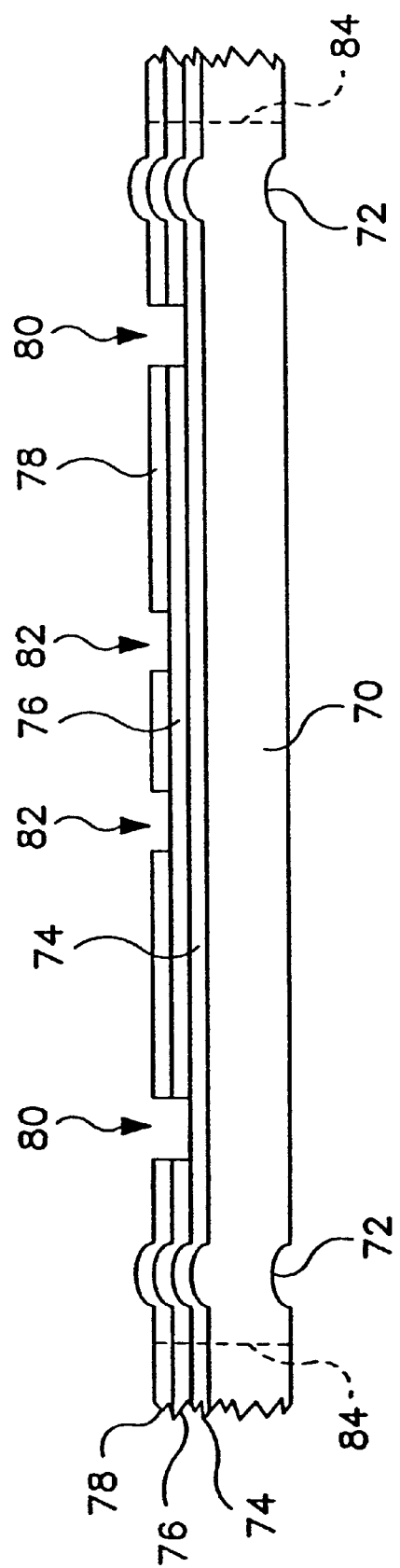

PROCESS FOR LASER MACHINING CONTINUOUS METAL STAMPED STRIP

BACKGROUND OF THE INVENTION

1. Field of the Invention

The present invention relates to a method and apparatus for mechanically forming and laser machining metal parts from a continuous strip.

2. Description of Related Art

Rotary shavers heads employ shaver cups which contact the user's skin and include slots which permit the hairs on the skin to pass through to be clipped by the cutters mounted within the cup. The mechanical forming and machining of rotary shaver heads is a labor intensive and costly process since the cups are first drawn by conventional mechanical forming process into individual parts. The individual parts are then mounted in further machinery wherein the top portion of the cup which contacts the user's skin is lapped, machined or other wise reduced in thickness to provide a relatively thin section. Finally, the cup is then mounted in another machine where cutting or grinding blades cut the finely spaced, individual slots in the top cup portion. This multiple processing of small parts cannot easily be automated and is costly to perform.

While laser machining to form holes has been known, laser machining processes have generally been done on finished parts (see for example U.S. Pat. No. 5,058,413), with attendant handling difficulties. While laser drilling of holes has been performed in steel sheets (e.g., U.S. Pat. No. 5,089,062), this has not generally been known in conjunction with mechanical formation of the sheet material.

Bearing in mind the problems and deficiencies of the prior art, it is therefore an object of the present invention to provide an improved process and apparatus to produce rotary shaver heads and other metal parts.

It is another object of the present invention to provide a process and apparatus which eliminates individual handling of rotary shaver and other metal parts during process, where the process requires making fine holes in the parts.

A further object of the invention is to provide an improved machining process and apparatus which provides flexibility in laser machining individual parts.

Still other objects and advantages of the invention will in part be obvious and will in part be apparent from the specification.

SUMMARY OF THE INVENTION

The above and other objects, which will be apparent to those skilled in the art, are provided in the present invention which relates in a first aspect to a process for making parts from deformable strip comprising providing a continuous strip of deformable material, preferably plastically deformable, from which parts are to be made; mechanically forming a plurality of parts in sequence along the strip; laser machining a plurality of parts in sequence along the strip; and separating the mechanically formed, laser machined parts from remaining portions of the strip. The laser machining may precede or follow the mechanically forming of the parts.

In another aspect, the present invention provides a process for making parts from strip metal comprising providing a strip of metal from which parts are to be made; partially mechanically forming a plurality of parts in a portion of the metal strip; laser machining the partially mechanically formed parts while in the metal strip; further mechanically forming the laser machined, partially mechanically formed parts while in the metal strip; and separating the further mechanically formed, laser machined parts from remaining portions of the metal strip. Preferably, the partial and further mechanically forming steps and the laser machining step include feeding the metal strip into a press to partially mechanically form the parts. The partial and further mechanically forming steps may comprise drawing the parts, and the laser machining step may comprise laser etching or laser machining holes in the parts. The method steps are preferably continuously and sequentially performed. The metal strip may be accumulated in an accumulator to control process speed differences between the partially mechanically forming step and the laser machining step or between the laser machining step and the further mechanically forming step.

In another related aspect, the present invention provides a process for making parts from strip metal comprising providing a strip of metal from which parts are to be made; providing a first press to partially mechanically form parts in the metal strip; providing a laser machining station to laser machine parts in the metal strip; and providing a second press to further mechanically form parts in the metal strip. The method is then performed by feeding the metal strip into the first press and partially mechanically forming a plurality of parts in a portion of the metal strip; thereafter feeding the metal strip into the laser machining station and laser machining the partially mechanically formed parts while in the metal strip; feeding the metal strip into the second press and further mechanically forming the laser machined, partially mechanically formed parts while in the metal strip; and separating the further mechanically formed, laser machined parts from remaining portions of the metal strip. The metal strip may be provided in coiled form, and the steps following feeding the metal strip into the first press are performed without recoiling the metal strip. The method may further include providing an accumulator between the first press and the laser machining station and accumulating metal strip in the accumulator to control process speed differences between the first press and the laser machining station. The partial mechanical forming step may comprise partially drawing the parts and the further mechanical forming step may comprise finish drawing the parts. The laser machining step may comprise laser etching the parts or laser machining holes in the parts.

In a particularly preferred embodiment, in the first press there are partially drawn a plurality of shaver cups in a portion of the metal strip, in the laser machining station there are laser machined slots in the shaver cups in the metal strip, more preferably curved slots, and in the second press there are finish drawn a plurality of the shaver cups in the metal strip.

In yet another aspect, the present invention relates to an apparatus for making parts from strip metal comprising an uncoiler adapted to uncoil a strip of metal from which parts are to be made; a first press adapted to partially mechanically form a plurality of parts in a portion of the metal strip; a laser machining station adapted to laser machine the partially mechanically formed parts while in the metal strip; and a second press adapted to further mechanically form the laser machined, partially mechanically formed parts while in the metal strip. Preferably, the second press is further adapted to separate the further mechanically formed, laser machined parts from remaining portions of the metal strip. The apparatus preferably includes a metal strip accumulator between the first press and the laser machining station adapted to control process speed differences between the first press and the laser machining station.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

FIG. 3b is a side elevational view of the part shown in FIG. 3a.

FIG. 4b is a side elevational view of the part shown along line 4b—4b in FIG. 4a.

FIG. 5b is a side elevational view of the part shown along line 5b—5b in FIG. 5a.

FIG. 6b is a side elevational view of the part shown along line 6b—6b in FIG. 6a.

FIG. 7b is a side elevational view of the part shown along line 7b—7b in FIG. 7a.

FIG. 8b is a side elevational view of the part shown along line 8b—8b in FIG. 8a.

FIG. 10 is a side view of an embodiment of the present invention employing laser etching.

DESCRIPTION OF THE PREFERRED EMBODIMENT(S)

Figure 1:
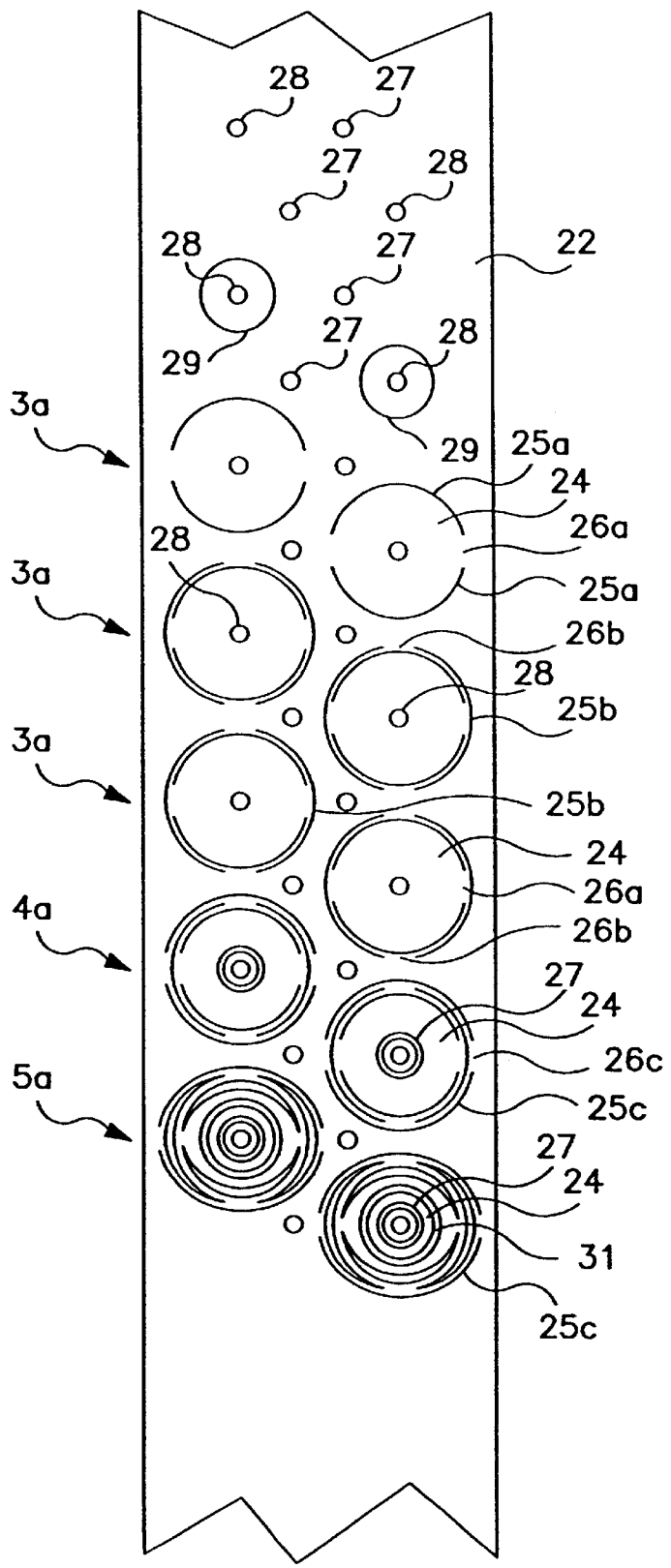
FIG. 1 is a top plan view of a continuous strip of metal or other formable material showing the progressive sequence of part formation in the strip prior to laser machining.

In describing the preferred embodiment of the present invention, reference will be made herein to FIGS. 1–10 of the drawings in which like numerals refer to like features of the invention. Features of the invention are not necessarily shown to scale in the drawings.

In general, the present invention is directed to a process and apparatus for laser machining formed strip metal into parts which are processed in continuous strip form, and then are separated into individual parts only at the end of mechanical and laser forming and machining. In particular, the process of the present invention has been found to be especially useful for producing rotary shaver cups or like items. The present invention creates a more robust rotary shaver by enhancing the closeness of the cut and the opportunity of the rotary shaver blades to cut. The closeness of cut is controlled by the thickness of the top portion of the shaver cup, i.e., the distance from the skin surface to the apex of the cutting element in its centrifugal runout. The opportunity to cut is the active perimeter that is available for cutting along the outer circumference of the shaver cup. The more openings there are in the cup, the faster the cup can collect hairs for cutting by the cutters. If the rotary cutter and shaver cup are not in proper engagement, the whisker hair can push the cutter down or away from the cut. Moreover, the rotary shaver cup of the present invention better directs hairs to uncurl and straighten out as they are being cut.

As broadly defined, the process generally comprises feeding a strip of metal into an otherwise conventional press and partially, mechanically forming a part in the strip, without removing the part from the strip. The partially formed part, as still attached to the strip, is then fed continuously into a laser machining station where a laser then performs the desired machining to the part while attached to the strip. As used herein, the term laser machining refers to a hole cutting, etching (e.g., partial cutting through a thickness) or other conventional laser machining processes. The laser machining may also precede the mechanical forming. Preferably, the partially formed, laser machined part, again as it is still attached to the strip, is then fed into another press and the mechanical part formation is finished and/or the part is cut out and separated from the strip.

Figure 2:
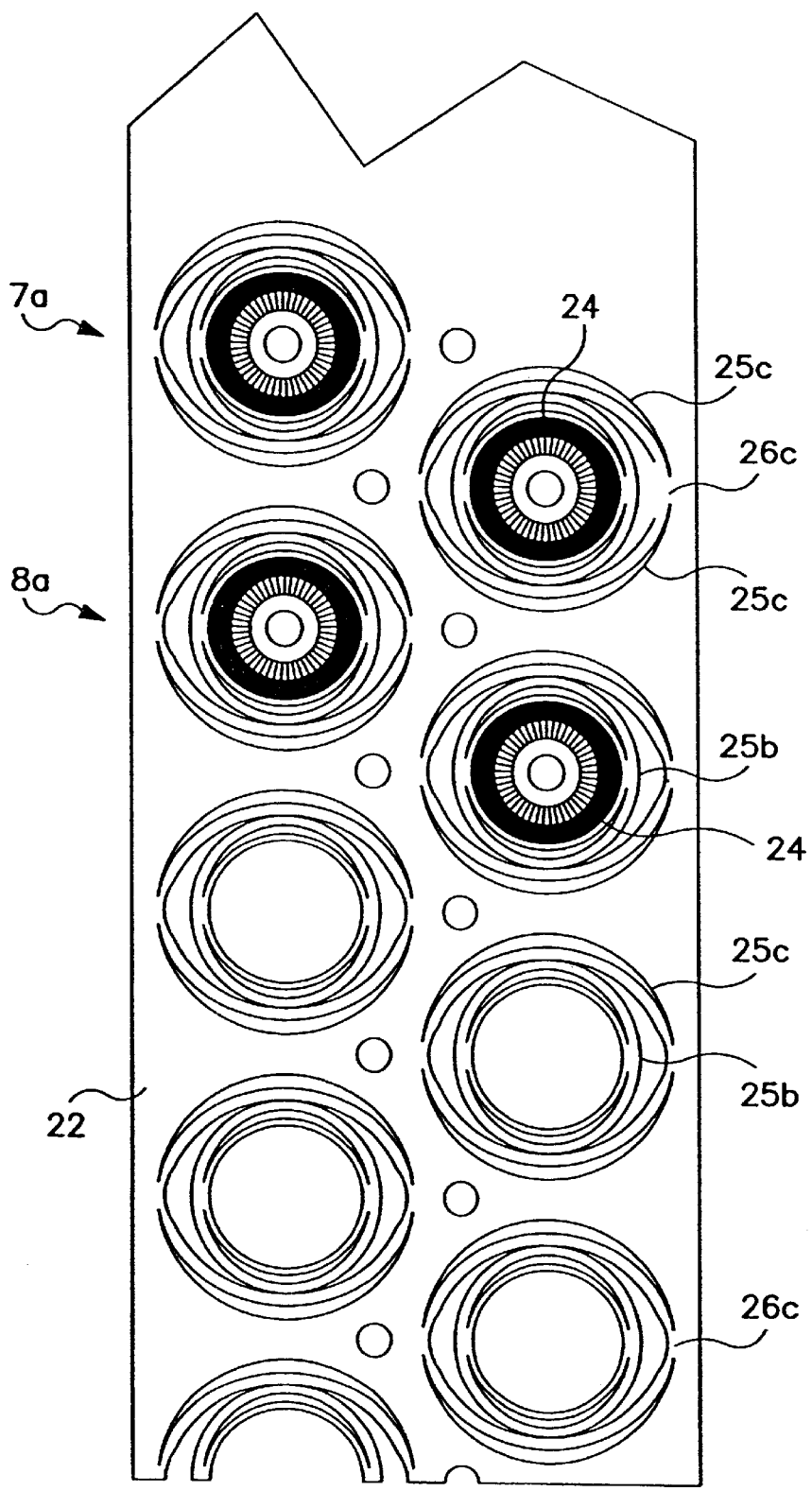
FIG. 2 is a top plan view of the continuous strip of metal or other formable material of FIG. 1 showing the progressive sequence of part formation in the strip subsequent to laser machining.
Figure 7A:
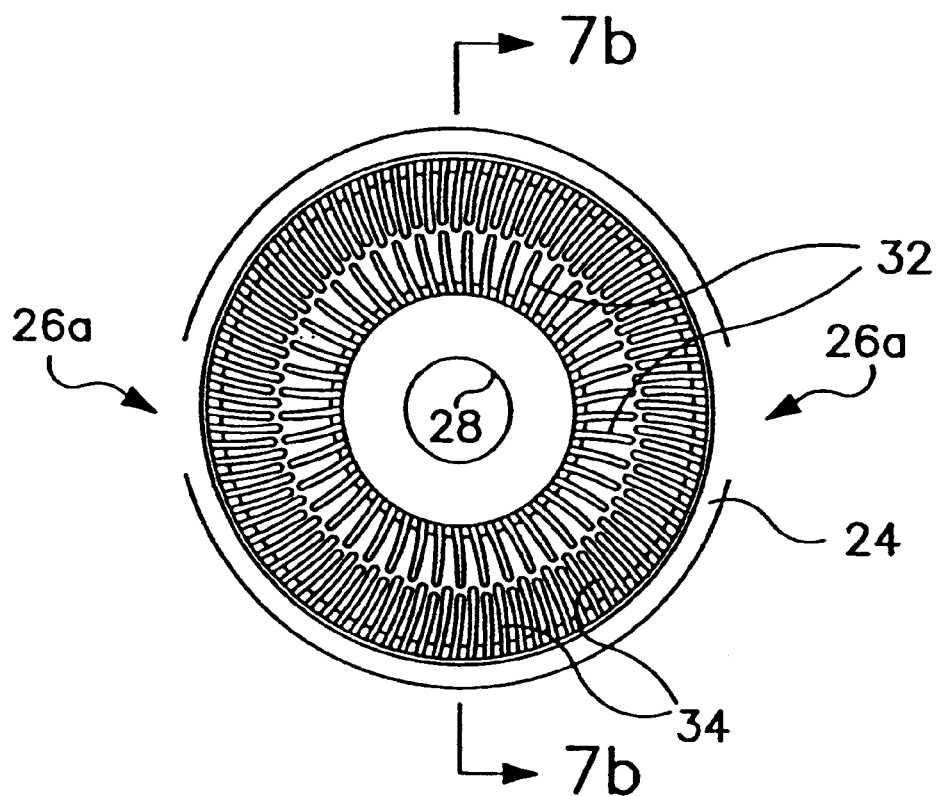
FIG. 7a is a top plan view of a fifth stage of a part formed in a strip in accordance with one embodiment of the present invention.
Figure 7B:
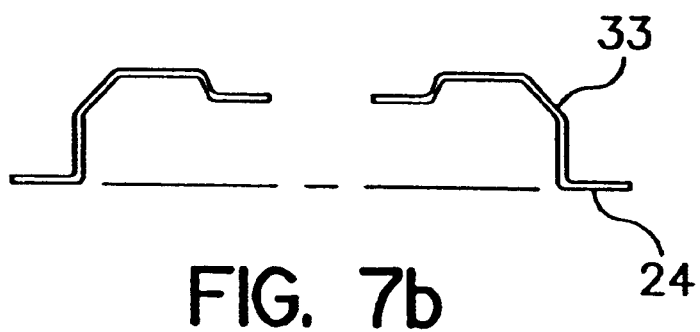
Figure 8A:
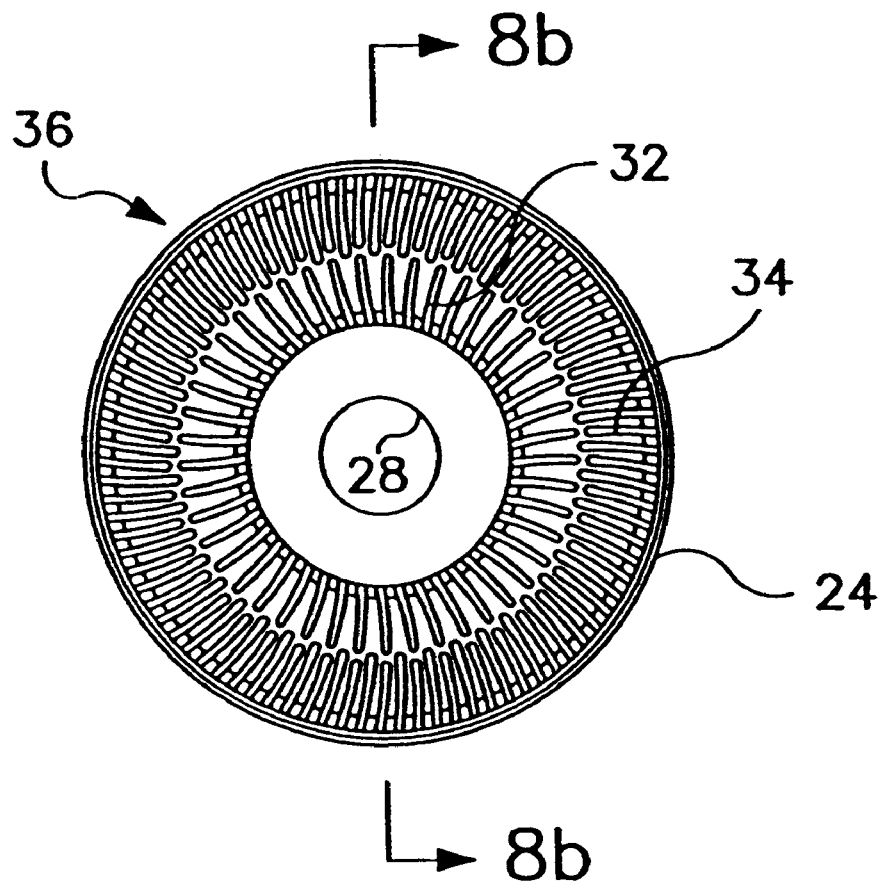
FIG. 8a is a top plan view of a sixth stage of a part formed from a strip in accordance with one embodiment of the present invention.
Figure 8B:
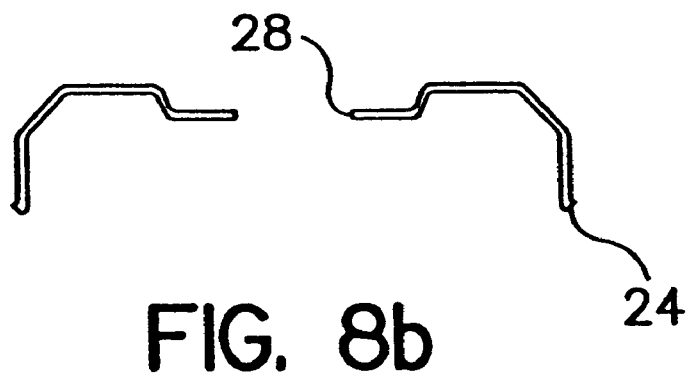
Figure 9:
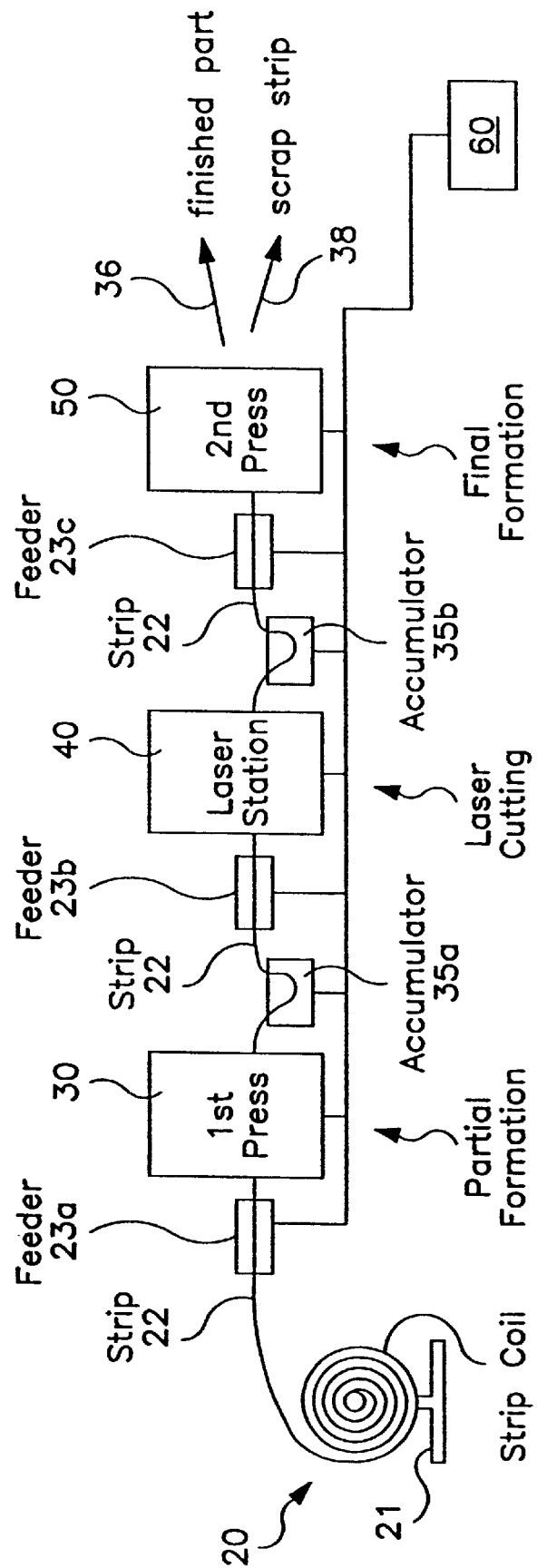
FIG. 9 is a side view, partially in schematic, of the preferred process in accordance with the embodiment of the present invention depicted in FIGS. 1–8b.

The process of the present invention used to form the preferred rotary shaver head is depicted in FIGS. 1-8b. Overall views of the strip before and after laser machining are shown in FIGS. 1 and 2, respectively, while individual part formation views are shown in FIGS. 2a–8b. The sequential locations of part formation views 2a–8a on the strip are indicated on FIGS. 1 and 2. An overall process apparatus schematic for this embodiment as well as other embodiments is depicted in FIG. 9. Initially, a strip 22 of sheet metal or other formable material is obtained in coil form 20 and for feeding into a first press 30 wherein the part is to be partially mechanically formed while still attached to strip 22. The strip used to form the rotary shaver cup in particular is preferably annealed medium carbon steel, although the process of the present invention may be used in general with low, medium or high carbon steel, or other metals and alloys in strip form. In the process, the coil of strip steel from which the part is to be made is first loaded into a payoff reel 21 and made ready to enter the feed in the first press. The feeder 23a, which precedes the first die, precisely sets the lead or progression of the strip as it travels through the die. After entering the first progressive die, registration or pilot holes 27, for advancing the strip through the die, and part central holes 28 creating the inner diameter shape are pierced in strip 22 in the first station. In a manner well known in the prior art, two parts are formed along the width of strip 22, with one part advanced with respect to the other by one-half the part pitch, for efficient utilization of the strip. While part formation views 3a–8a are indicated with respect to the parts on the left hand portion of the strips shown in FIGS. 1 and 2, it is to be understood that the same operations are made to the parts on the right hand portion of the strip.

In the second die station the portion 29 of the strip around central hole 28 is thinned from its original strip thickness by cold reducing or hammering. This thickness reduction in area 29 is desirable for the central portion of the finished part which eventually forms the slotted comb portion of the shaver head, and will be omitted from subsequent views for clarity of other operations.

Figure 3A:
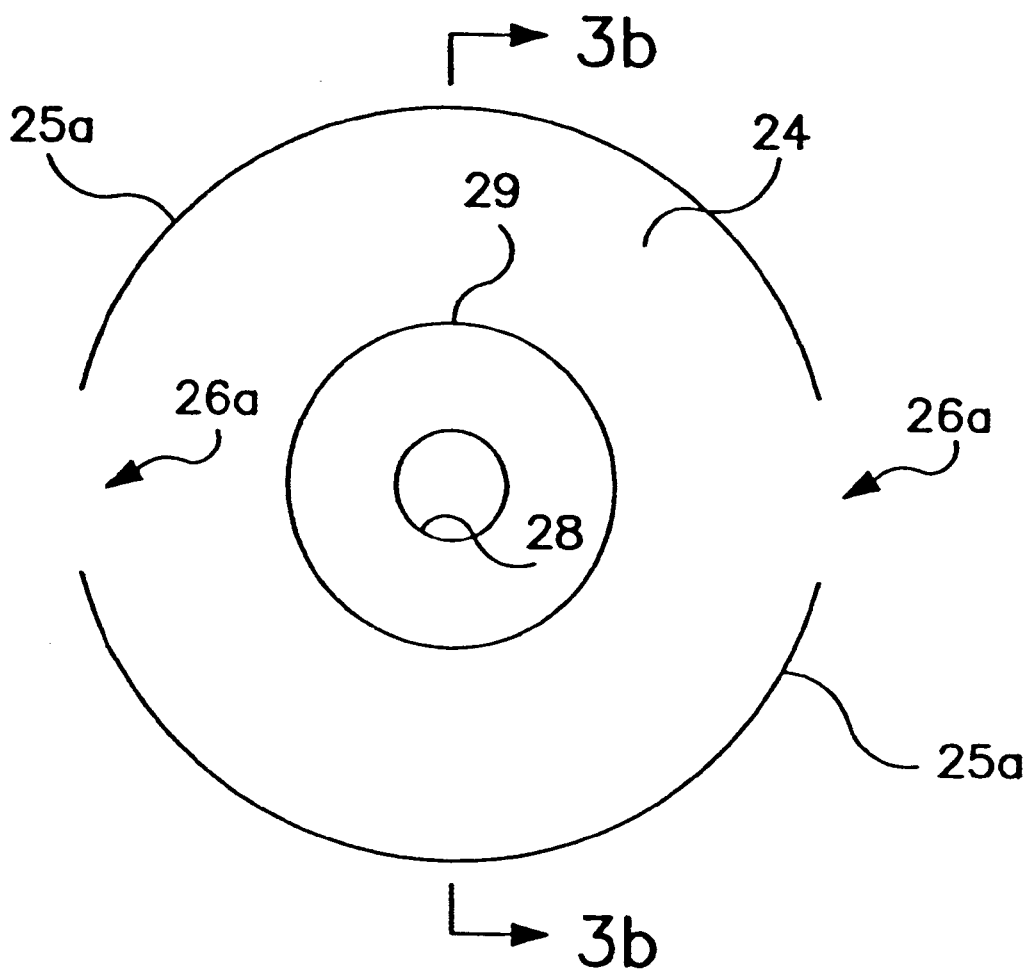
FIG. 3a is a top plan view of a first stage of a part formed in a strip in accordance with one embodiment of the present invention.
Figure 3B:
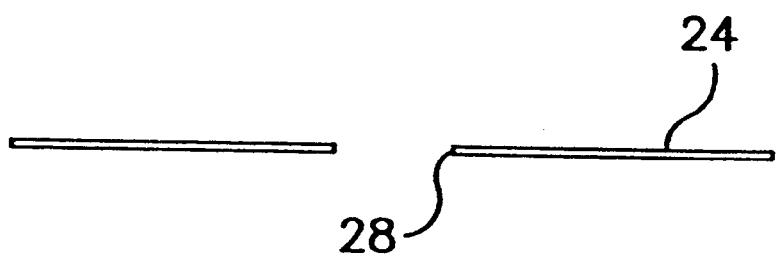
Figure 4A:
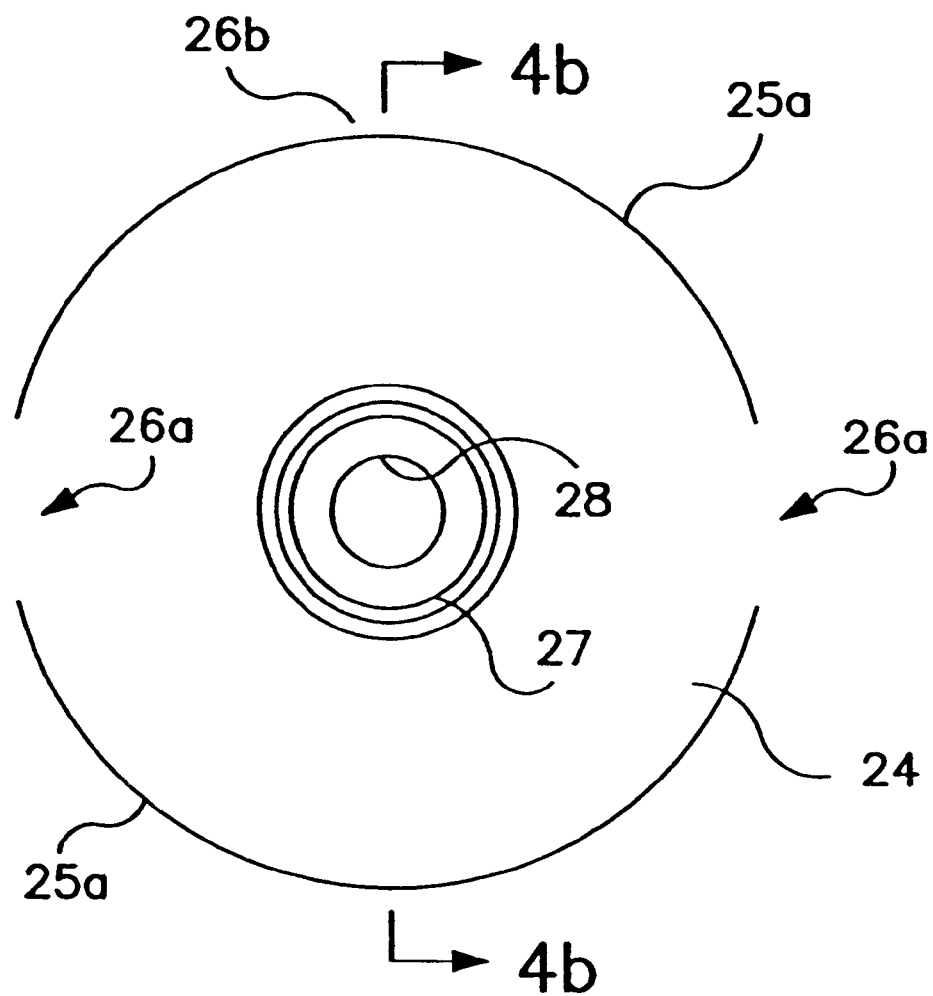
FIG. 4a is a top plan view of a second stage of a part formed in a strip in accordance with one embodiment of the present invention.
Figure 4B:
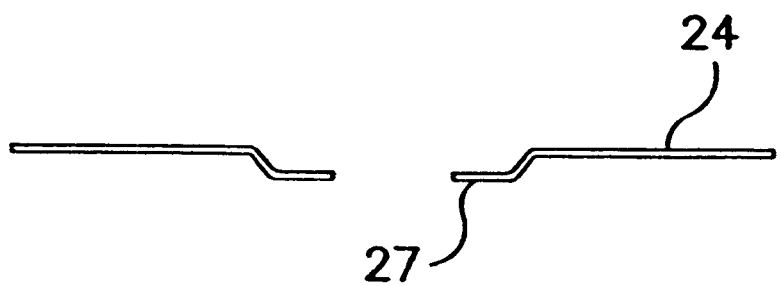
Figure 5A:
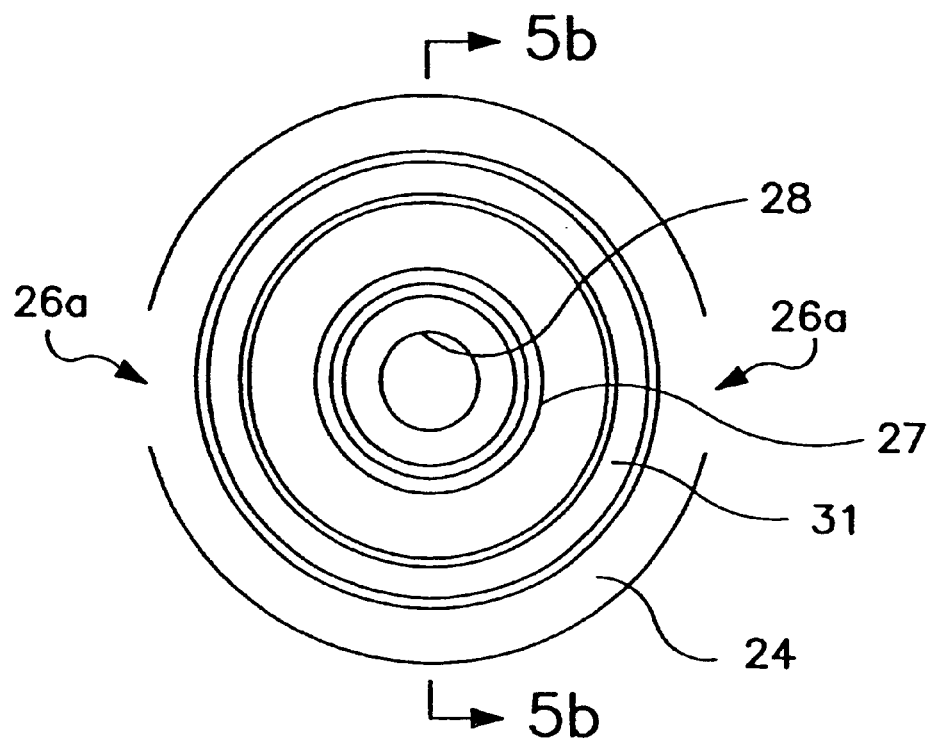
FIG. 5a is a top plan view of a third stage of a part formed in a strip in accordance with one embodiment of the present invention.
Figure 5B:
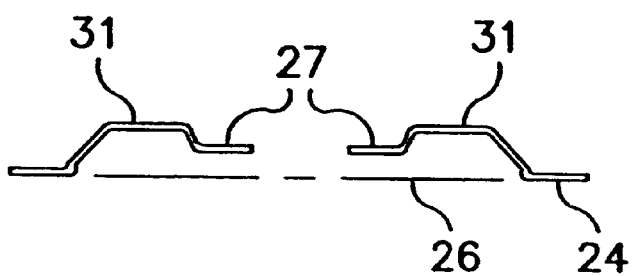

In the case of the rotary shaver head, the next die station in press 30 makes partial lance cuts 25a to substantially form flat blank 24 while uncut sections 26a retain blank 24 in strip 22 (FIGS. 1, 3a and 3b). Additional lance cuts 25b with uncut sections 26b rotated 90° from uncut sections 26a are then formed (FIG. 1), so that part blank 24 remains connected to strip 22. In the second operation on part blank 24, a subsequent die station in press 30 draws a central concave depression 27 downward (FIGS. 1, 4a and 4b). Additional lanced cuts 25c again rotated 90° are added outside cuts 25b, leaving uncut sections 26c. The partially mechanically formed part 24 begins to shrink in diameter but still remains connected to strip 22 by a connecting web formed by lanced cuts 25a, 25b, 25c and uncut sections 26a, 26b, 26c. This connecting web remain to connect the partially formed part to strip 22 throughout the processing until the final die station in the second press, as discussed further below. In the next die station in press 30, a second draw upward creates what will be the top outer form 31 of rotary shaver part 24 (FIGS. 1, 5a and 5b). It is to be understood that the part forming operations described above are progressive and sequential.

Figure 6A:
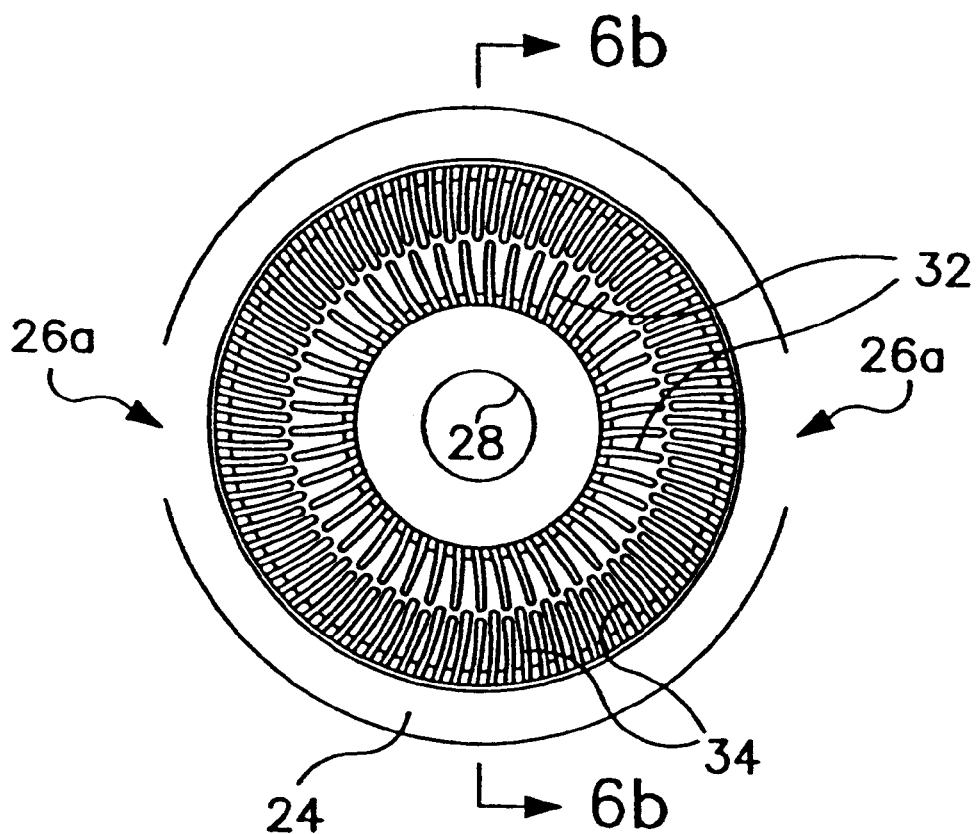
FIG. 6a is a top plan view of a fourth stage of a part formed in a strip in accordance with one embodiment of the present invention.
Figure 6B:
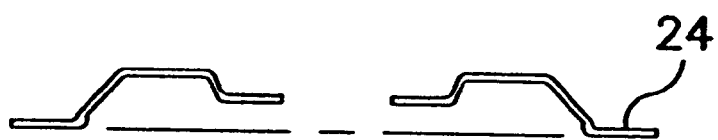

The continuous strip of partially formed parts then leaves the first press, travels through a delay loop in accumulator 35a and then enters a second feeder 23b before entering a multi-head laser machining station 40. The laser is capable of creating a burr free through hole and with precise geometry and tight slot width by controlling the width of the laser beam. The laser obtains its orientation to the cup from registration holes 27 in the strip to which the cup is attached. The laser may have as many laser beam emitting heads as needed coupled in series to create repetitive cutting depending on the number of cups in the strip progression. As the series of parts 24 and strip 22 is fed into laser station 40, a laser beam performs the desired machining operation. In the case of the rotary shaver head, the laser cuts a series of slots in thinned section 29 to create a series of slots 32, 34 (FIGS. 6a, 6b). Slots 32 extend radially outward in a somewhat curved fashion along an inner annular portion of part 24 while slots 34 also extend outward in a similarly curved fashion, in the same direction as slots 32, in an outer annular portion of part 24. These slots 32, 34 permit the hairs on the user's skin to pass through the shaver cup and be cut by a cutting blade mounted within the cup. The remaining metal portions between these slots create the stationary counterblades against which the rotary cutting blade pinches and trims the hairs. This slotted portion of the shaver head is also called the comb portion.

The curved, non linear slots which create the curved comb portion permits improved cutting geometry of the shaver head. The clockwise circular pattern of comb slots enhances whisker entry into the cut zone and permits tall or standing curled whisker hairs into the screen cup. The actual slot width is not dictated by any particular cutting saw parameters as in the prior art, but simply by the width and thermal column of the laser beam, thereby creating any size comb slot needed for any beard condition.

After exiting the laser station, the strip and partially laser machined formed parts enters a second delay loop accumulator 35b and feeder 23c prior to entering the second press 50 (FIG. 9). Both the first and second delay loops 35a, 35b and feeders 23a, 23b, 23c are useful to correct small irregularities in feed timing to ensure continuous function of presses 30 and 50 and laser station 40. Computer 60 is connected to and controls all of the machining stations 30, 40, 50, accumulators 35a, 35b and feeders 23a, 23b, 23c, and any other mechanical systems used in processing the present invention. Strip parts 24, which are still connected by webs created by partial lanced cuts 25a, 25b and uncut edges 26a, 26b to strip 22, are then fed in a controlled manner into second mechanical press 50 for finished forming. In the case of the rotary shaver head, this finish forming comprises one or more die stations in press 50 which continues the drawing of the part 24 to a deeper draw, without interfering or reforming the portions of the cup which have been laser machined. The series of draw stations establishes the final elevation and outer diameter of the cup. During these draw stations the die system first engages the existing laser machined comb portion below the demarcation area of the first draw. By capturing the first draw comb portion before the second draw station is engaged, the comb portion of the cup is securely isolated from any distortion. A double bend 33 is created at the periphery of part 24 to create additional hoop strength or stiffening to the part (FIGS. 2, 7a and 7b). The cup is then drawn to its final elevation and is carried to a pinch trim station where it is blanked through the die and severed from the strip becoming a separate piece 36 (FIG. 2, 8a and 8b). The remaining strip 22, minus the formed parts, continues to a scrap chopper which creates the scrap strip 38 which is ejected from the press and then removed for proper disposal.

The finished formed rotary shaver cup 36 may then be further processed as desired. Although prior to the first draw stations in press 30 the portion of the part which forms the actual comb face was described as being cold formed or hammered to reduce its thickness by 50% or more, alternatively a lapping operation may be performed to reduce the thickness of the cut comb section of the shaver. For example, rotary lapping of the cup face may decrease the thickness of the strip from an initial thickness of 0.008 inches to a final thickness of 0.0032 –0.0046 inches. Once the comb portion of the separated part is at the desired thickness, part 36 may then be pressure washed and a nickel plating applied for example, with a thickness of 0.006 inches.

In processing other parts, instead of through cutting by the laser machining process, the process of the present invention may utilize an engraving laser machining process to mark additional features on the product. This laser engraving may be used with or without other laser machining for other parts for example identification plates. This may be accomplished as shown in FIG. 10 by starting with a strip 70, such as aluminum or steel, which may be supplied in coil form and continuously coated with a plurality of different color paints or coatings, such as three sequential layers 74, 76, 78. A first press includes one or more dies for piercing holes and forming a border bead 72 in the coated strip 70. The strip then enters the laser station where a laser beam etches or burns through the coating layers to different depths to expose different color layers, for example, two layer etching 80 to expose color layer 74 or single layer etching 82 to expose different color layer 76. In this manner desired characters or symbols of colors 74 and 76 are created on color background 78. By employing laser etching speeds of up to 1000 in./min. or more and variable laser beam widths created by multiple laser heads, the laser machining station will be able to keep up with the high speed mechanical forming operations. A subsequent press would then cut the finished part from the strip along edge 84.

The present invention may be integrated with existing manufacturing systems which utilize one or more die stations to mechanically form a part, before, after, or both before and after, the laser machining stage. The process is achieved in continuous strip format resulting in progressive part manufacturing that has considerable advantages over individual part handling used prior for laser machining parts.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A process for making parts from strip metal comprising:
   providing a strip of metal from which parts are to be made;
   partially mechanically forming a plurality of parts in a portion of the metal strip;
   laser machining the partially mechanically formed parts while in said metal strip;
   further mechanically forming the laser machined, partially mechanically formed parts while in said metal strip; and
   separating the further mechanically formed, laser machined parts from remaining portions of said metal strip.

2. The method of claim 1 wherein the steps are continuously and sequentially performed.

3. The method of claim 2 wherein further including accumulating metal strip in an accumulator to control process speed differences between the partially mechanically forming step and the laser machining step or between the laser machining step and the further mechanically forming step.

4. The method of claim 1 wherein the further mechanically forming step comprises finish drawing the parts.

5. The method of claim 1 wherein the partially mechanically forming step includes feeding the metal strip into a press to partially mechanically form the parts.

6. The method of claim 1 wherein the laser machining step includes feeding the metal strip into a laser machining station to laser machine the parts.

7. The method of claim 1 wherein the further mechanically forming step includes feeding the metal strip into a press to further mechanically form the parts.

8. The method of claim 1 wherein the partially mechanically forming step comprises partially drawing the parts.

9. The method of claim 1 wherein the laser machining step comprises laser machining holes in the parts.

10. The method of claim 1 wherein the laser machining step comprises laser etching the parts.

11. A process for making parts from strip metal comprising:
    providing a strip of metal from which parts are to be made;
    providing a first press to partially mechanically form parts in the metal strip;
    providing a laser machining station to laser machine parts in the metal strip;
    providing a second press to further mechanically form parts in the metal strip;
    feeding the metal strip into said first press and partially mechanically forming a plurality of parts in a portion of the metal strip;
    thereafter feeding the metal strip into said laser machining station and laser machining the partially mechanically formed parts while in said metal strip;
    feeding the metal strip into said second press and further mechanically forming the laser machined, partially mechanically formed parts while in said metal strip; and
    separating the further mechanically formed, laser machined parts from remaining portions of said metal strip.

12. The method of claim 11 wherein the partially mechanically forming step comprises partially drawing the parts.

13. The method of claim 11 wherein the laser machining step comprises laser machining holes in the parts.

14. The method of claim 11 wherein the laser machining step comprises laser etching the parts.

15. The method of claim 11 including providing the metal strip in coiled form and wherein the steps following feeding the metal strip into said first press are performed without re-coiling the metal strip.

16. The method of claim 15 further including providing an accumulator between the first press and the laser machining station and accumulating metal strip in the accumulator to control process speed differences between the first press and the laser machining station.

17. The method of claim 11 wherein the further mechanically forming step comprises finish drawing the parts.

18. The method of claim 11 wherein in said first press there are partially drawn a plurality of shaver cups in a portion of the metal strip.

19. The method of claim 18 wherein in said laser machining station there are laser machined slots in said shaver cups in said metal strip.

20. The method of claim 19 wherein in said second press there are finish drawn a plurality of said shaver cups in said metal strip.

21. The method of claim 18 wherein in said laser machining station there are laser machined curved slots in said shaver cups in said metal strip.

22. An apparatus for making parts from strip metal comprising:
    an uncoiler adapted to uncoil a strip of metal from which parts are to be made;
    a first press adapted to partially mechanically form a plurality of parts in a portion of the metal strip;
    a laser machining station adapted to laser machine the partially mechanically formed parts while in said metal strip; and
    a second press adapted to further mechanically form the laser machined, partially mechanically formed parts while in said metal strip.

23. The apparatus of claim 22 wherein the second press is further adapted to separate the further mechanically formed, laser machined parts from remaining portions of said metal strip.

24. The apparatus of claim 22 further including a metal strip accumulator between the first press and the laser machining station adapted to control process speed differences between the first press and the laser machining station.

* * * * *